United States Patent [19]
Huot de Longchamp

[11] 3,826,457
[45] July 30, 1974

[54] SUSPENSION DEVICE FOR A VEHICLE SEAT
[75] Inventor: Jacques-Albert Huot de Longchamp, Paris, France
[73] Assignee: Sable Freres International
[22] Filed: June 21, 1973
[21] Appl. No.: 371,965

[30] Foreign Application Priority Data
Nov. 28, 1972 France .......................... 72.42200

[52] U.S. Cl. .................. 248/399, 248/421
[51] Int. Cl. ........................ A47c 3/22, B60n 1/06
[58] Field of Search ........... 248/399, 432, 157, 419, 248/439, 421; 297/345, 338

[56] References Cited
UNITED STATES PATENTS
1,708,632  4/1929  Podiebrad ..................... 248/399 X
1,734,776  11/1929  Pallenberg ..................... 248/399 X FOREIGN PATENTS OR APPLICATIONS
554,671  7/1943  Great Britain ..................... 248/421
159,414  6/1964  U.S.S.R. .......................... 248/421
930,903  7/1963  Great Britain ..................... 248/399

Primary Examiner—Roy D. Frazier
Assistant Examiner—Robert W. Gibson, Jr.
Attorney, Agent, or Firm—Toren, McGeady and Stanger

[57] ABSTRACT

Two parallel and vertical pairs of levers of identical length are each coupled in articulated relation at an intermediate point and pivotally mounted at the upper ends in two parallel upper guides and at the lower ends in two parallel horizontal guides which support the complete suspension system. A shaft is mounted between the points of articulation and rotatably applied by elastic means against a cam having a concave cylindrical surface which is positionally adjustable with respect to the lower guides.

4 Claims, 3 Drawing Figures

SUSPENSION DEVICE FOR A VEHICLE SEAT

This invention relates to a suspension device for a vehicle seat, especially for public transport vehicles, public works vehicles, tractors and the like. The constructional design of the device is both simple and economical as well as having a particularly small overall height.

The device in accordance with the invention is constituted by two pairs of levers of identical length which are pivotally coupled to each other at an intermediate point of their length in two parallel vertical planes, the upper ends of said pairs of levers being pivotally mounted within two parallel upper guides which are intended to support a seat whilst the lower ends thereof are pivotally mounted within two parallel horizontal guides for supporting the complete assembly and the intermediate points of articulation of the two pairs of levers being connected to each other by means of a rotary shaft applied under the action of elastic means against a cam which is positionally adjustable with respect to the lower guides.

A better understanding of the invention will be gained from the following description in which one embodiment of a vehicle-seat suspension device in accordance with the invention is shown by way of example and not in any sense by way of limitation, reference being made to the accompanying drawings, in which.

Figure 1:
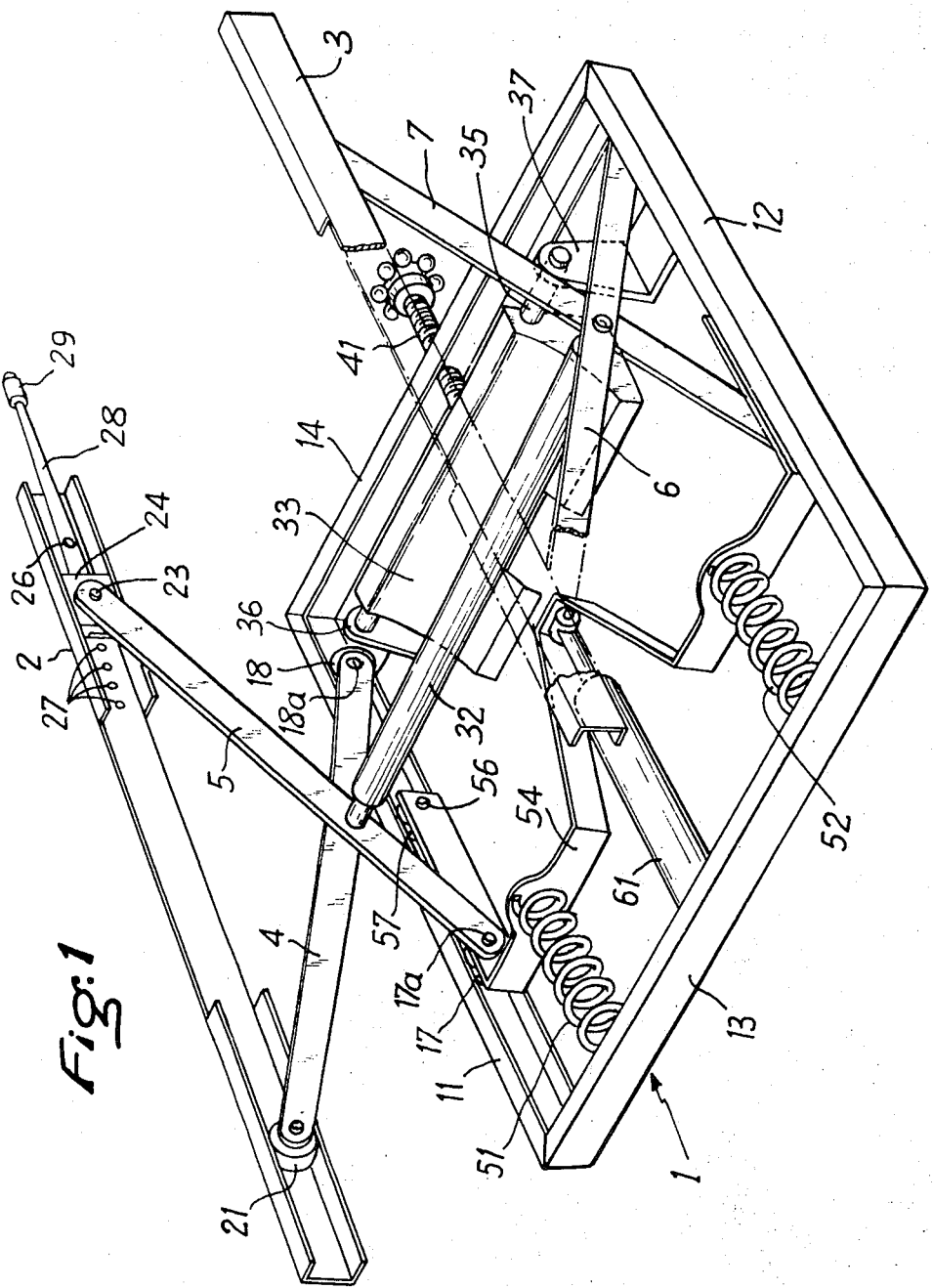
FIG. 1 is a view in perspective with portions broken away showing the complete device in the top position, that is to say under no load.

The seat suspension device which is illustrated in FIG. 1 comprises a lower supporting frame 1 which is intended to be carried by the chassis of the vehicle and two parallel horizontal upper guides 2, 3 on which the seat (not illustrated) is intended to be fixed and which are connected to the frame 1 by two pairs of levers 4, 5 and 6, 7 respectively.

The frame 1 is constituted by two parallel guides 11, 12 formed of two channel-section members laid on one side and in opposite relation and of two cross-members 13, 14 which, in the example shown, also consist of similar channel-section members. The lower ends of the two levers 4 and 5 are supported respectively by two rollers 17, 18 which run within the guide 11; similarly, the lower ends of the two other levers 6, 7 are fitted with rollers which run within the other guide 12. The spindles of the rollers 17 and 18 are designated by the references 17A and 18A.

The upper end of the lever 4 is supported by a roller 21 which runs within the guide 2 and the upper end of the lever 5 is pivotally mounted by means of a pin 23 on a shoe 24 which is capable of sliding within the guide 2 and can be fixed in position at any desired point of this latter by any suitable locking system which is represented diagrammatically in the example by a lug 26. Said lug is capable of engaging within any one of a series of holes 27 formed in the web of the guide 2 and is carried by a flexible strip 28 terminating in a handle 29 which serves to move the seat forward to a greater or lesser extent by causing the upper guides to slide along the two pairs of levers. Similarly, the upper end of the lever 6 is carried by a roller which runs within the guide 3 and the upper end of the lever 7 is carried by a shoe which is capable of moving within the guide 3.

Figure 2:
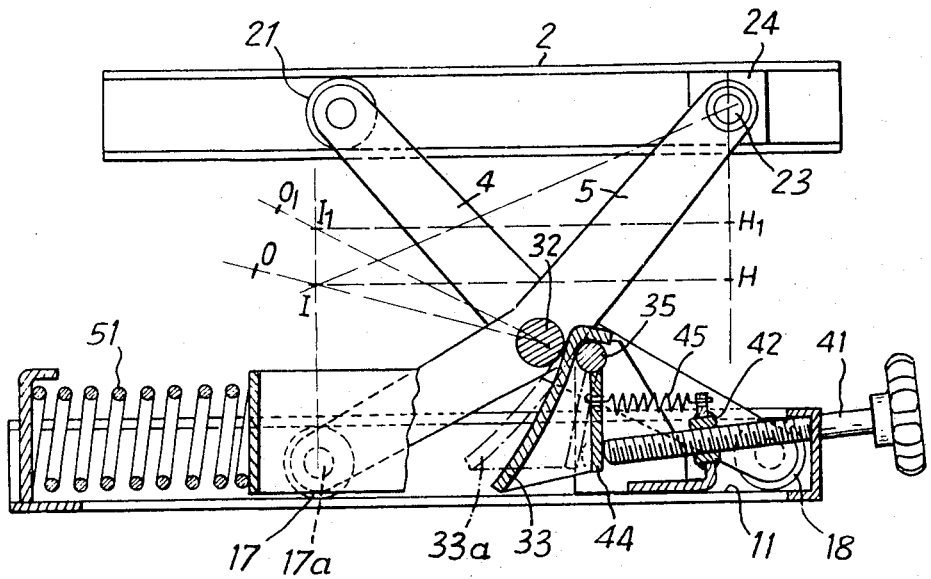
FIG. 2 is a schematic diagram in which the kinematics of the mechanism as shown in the same position as in FIG. 1 are intended to be clearly brought out.

The four levers 4, 5, 6, 7 have the same length and are pivotally mounted one against the other at an intermediate point of their length in two parallel vertical planes respectively on the two ends of a cylindrical shaft 32 which is capable of rolling on a cam 33 having the shape of a portion of concave cylindrical surface, the axis O of which is parallel to the shaft 32 (as also shown in FIG. 2).

The top portion of the cam 33 is supported by a shaft 35 which is rotatably mounted in two bearing brackets 36, 37 which are rigidly fixed to the two lower guides 11, 12 respectively, under the action of an adjusting screw 41 (also shown in FIG. 2) which serves to regulate the flexibility of suspension and is engaged in a nut 42, said nut being rigidly fixed to the cross-member 14 of the lower frame. The end of said screw is applied against a bearing plate 44 and this latter is rigidly fixed to the shaft 35 which carries the cam 33. A spring 45 maintains the bearing plate 44 in contact with the end of the adjusting screw 41.

The rotary shaft 32 is maintained applied against the cam 33 under the action of an elastic system constituted in the example by two helical compression springs 51, 52, one end of which is applied against the internal face of the cross-member 13 and the other end of which is applied against a movable cross-member 54. Said movable cross-member carries the spindles of the two rollers such as the roller 17 as well as the spindles such as 56 of two further rollers 57 which also run within the two fixed lower guides 11 and 12 respectively. The cross-member 54 is subjected in addition to the action of a shock-absorber 61, for example a hydraulic shock-absorber which is interposed between the stationary cross-member 13 and the movable cross-member 54.

The operation of the device is as follows:

It may be assumed that the suspended weight is applied at the upper ends of the two levers 5 and 7 by means of shoes such as the shoe 24 respectively in view of the fact that, when said weight is distributed over both upper guides 2, 3, said two guides remain parallel to the lower frame 1 by reason of the symmetry of the arms with respect to a vertical geometrical plane which passes through the axis of the shaft 32. Under these conditions, it is well known in accordance with the principle of virtual work that the equilibrium of the system does not depend on the position of the load on the upper guides.

Under these conditions, the law of the path followed by the lever 5 is determined by the lower guide 11 which retains the roller 17 mounted on the lower end of said lever and by the application of the shaft 32 against the cam 33. Referring to FIG. 2, it is apparent that the immediate construction of the instantaneous center of rotation I of the lever 5 shows that the movement of said lever is equivalent to a movement of rotation about this fictitious point of articulation I with a ratio of the force of reaction of the assembly consisting of the two springs 51, 52 to the load suspended from the pins such as 23 which is equal to IH/I-17A. In other words, the suspension is equivalent to that which would be obtained by means of a pair of elbowed levers pivoted at the point I, the two ends of which are assumed to be located respectively at 23 and 17A. As the suspended load is heavier and the springs 51, 52 are compressed to a greater extent, so the shaft 32 rolls further downwards on the cam 33. The oscillations are damped by the shock-absorber 61.

Figure 3:
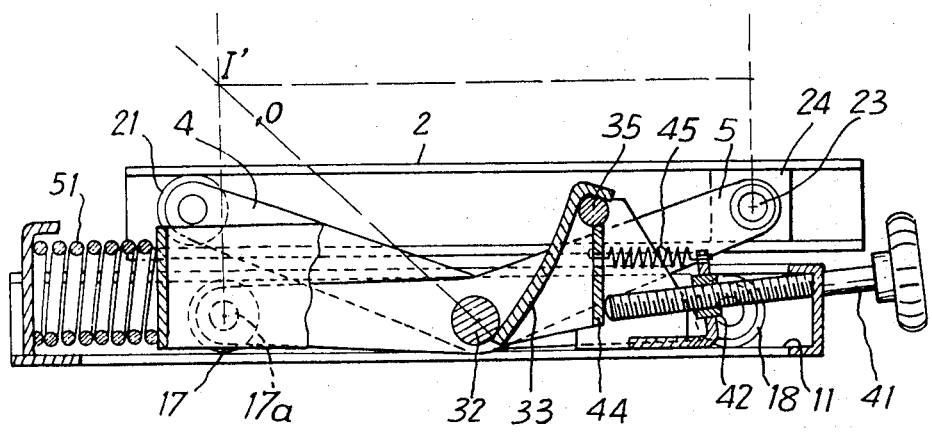
FIG. 3 is a view which is similar to FIG. 2 and shows the device in the lowest position of maximum load.

In the bottom position shown in FIG. 3, a similar construction gives the new instantaneous center I' which is in any case located at a short distance from I. It can be established in a more precise manner that, as a result of judicious orientation of the cam 33 and a radius of curvature of suitable value, the fictitious ratio of the lever arms on which the springs and the load produce action respectively remains practically constant and that the displacements of the pin 23 are carried out substantially along a vertical line. The considerable advantage of the system under consideration as compared with a system of levers which are materially articulated at I lies in a substantial reduction in overall height of the system and in the ease with which the position of the fictitious point of articulation I can be varied.

When the cam 33 is caused to pivot by means of the adjusting screw 41 from the position shown in full lines in FIG. 2 to the position 33A shown in chain-dotted lines, the instantaneous center of rotation of the lever 5 moves from I to $I_1$ and the rigidity of the suspension is modified in the ratio $$(I_1\ 17A/I\ 17A)^2$$

Adaptation of the suspension to the weight of thd driver is therefore carried out in a particularly simple and economical manner. No effort is required if the adjustment is performed while the system is in the expanded position shown in FIG. 2 since the center of rotation of the cam is chosen so as to ensure that the pivotal motion of said cam does not modify the initial tension of the springs 51, 52, the shaft 32 being accordingly applied against the cam at a point which does not move in practice during the pivotal motion of said cam.

The invention is clearly not limited to the embodiment as hereinbefore described with reference to the drawings; depending on the applications which are contemplated, modifications may accordingly be made therein without consequently departing either from the scope or the spirit of the invention.

From this it accordingly follows, for example, that the system which applies the rotary shaft 32 elastically against the cam 33 could be designed in any other suitable manner.

What is claimed is:

1. A suspension device for a vehicle seat, comprising two pairs of slanting levers of identical lengths, the levers of each said pair being pivotally coupled together at a point intermediate their ends and each pair of levers being positioned in a vertical plane disposed in spaced parallel relationship to the plane of the other said pair of levers, two horizontally arranged laterally spaced parallel upper guides arranged to support a seat, each said pair of levers being associated with a different one of said upper guides and the upper ends of said levers in each said pair of levers being pivotally mounted in said upper guide with which it is associated and at least one said lever in each said pair being slidably mounted in said upper guide, two horizontally arranged laterally spaced parallel lower guides positioned below said upper guides and arranged to support the suspension device, each said pair of levers being associated with a different one of said lower guides and the lower ends of said levers in each said pair of levers being pivotally and slidably mounted in said lower guide with which it is associated, a horizontally arranged rotary shaft extending between and interconnecting the intermediate points of articulation of said levers in each said pair of levers, a cam supported from and extending transversely between said lower guides and being positionally adjustable about an axis extending transversely of said lower guides, and resilient means operatively associated with each said pair of levers for biasing said rotary shaft against said cam.

2. A suspension device, as set forth in claim 1, wherein said cam has a concave cylindrical surface extending transversely between said lower guides and said shaft is biased by said resilient means against said concave cylindrical surface, the axis of said cam extending in parallel with said shaft and said cam being pivotally displaceable about its axis, and adjusting means are operatively associated with said cam for pivotally displacing it about its axis.

3. A suspension device, as set forth in claim 1, wherein a horizontal stationary cross-member extends between and interconnects said lower guides at a position spaced from said cam and located on the opposite side of said shaft from said cam, a horizontally arranged movable cross-member extending between said lower guides and connected to the points of articulation of the lower ends of one said lever in each said pair of levers to said lower guides, said movable cross-member located between said stationary cross-member and said shaft, and said resilient means comprises springs extending in the direction of said lower guides and extending between said stationary cross-member and said movable cross-member.

4. A suspension device for a vehicle seat, comprising two pairs of slanting levers of identical lengths, the levers of each said pair being pivotally coupled together at a point intermediate their ends and each pair of levers positioned in a vertical plane disposed in spaced parallel relationship with the plane of the other said pair of levers, two horizontally arranged laterally spaced parallel upper guides arranged to support a seat, each said pair of levers being associated with a different one of said upper guides and the upper ends of said levers in each said pair of levers being pivotally mounted in said upper guide with which it is associated and at least one of said levers in each said pair being slidably mounted in said upper guides, two horizontally arranged laterally spaced parallel lower guides positioned below said upper guides and arranged to support the suspension device, each said pair of levers being associated with a different one of said lower guides and the lower ends of said levers in each said pair of levers being pivotally and slidably mounted in said lower guide with which it is associated, a horizontally arranged rotary shaft extending between and interconnecting the intermediate points of articulation of said levers in each said pair of levers, a cam supported from and extending transversely between said lower guides and being pivotally adjustable about an axis extending in parallel with said shaft, resilient means operatively associated with each said pair of levers for biasing said rotary shaft against said cam, said cam having a concave cylindrical surface against which said shaft is biased, adjusting means operatively associated with said cam for pivotally displacing it about its axis, a horizontal stationary cross-member extending between and interconnecting said lower guides at a position spaced from said cam and located on the opposite side of said shaft from the concave cylindrical surface of said cam, a horizontally arranged movable cross-member extending between said lower guides and connected to the points of articulation of the lower ends of one said lever in each said pair of levers to said lower guides, said movable cross-member located between said stationary cross-member and said shaft, and said resilient means comprising springs extending in the direction of said lower guides and disposed in contact with and extending between said stationary cross-member and said movable cross-member.

* * * * *